US008311996B2

(12) United States Patent
Looi

(10) Patent No.: US 8,311,996 B2
(45) Date of Patent: Nov. 13, 2012

(54) GENERATING CONTENT TO SATISFY UNDERSERVED SEARCH QUERIES

(75) Inventor: Mark Looi, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 896 days.

(21) Appl. No.: 12/016,217

(22) Filed: Jan. 18, 2008

(65) Prior Publication Data
US 2009/0187503 A1 Jul. 23, 2009

(51) Int. Cl.
G06F 7/00 (2006.01)
G06F 17/30 (2006.01)

(52) U.S. Cl. .................. 707/705; 705/14.52; 705/14.53; 705/14.71; 705/14.72; 705/14.73

(58) Field of Classification Search .................. 707/705, 707/706, 999.003; 705/14.4, 14.49, 14.52, 705/14.53, 14.54, 14.69, 14.71, 14.72, 14.73
See application file for complete search history.

(56) References Cited

U.S. PATENT DOCUMENTS

| 6,704,729 | B1 | 3/2004 | Klein et al. | |
| 6,778,975 | B1* | 8/2004 | Anick et al. | 707/1 |
| 6,829,599 | B2 | 12/2004 | Chidlovskii | |
| 6,886,010 | B2 | 4/2005 | Kostoff | |
| 6,980,984 | B1 | 12/2005 | Huffman et al. | |
| 7,379,949 | B2* | 5/2008 | Chowdhury | 707/103 |
| 7,449,914 | B2* | 11/2008 | Kim et al. | 326/30 |
| 7,552,112 | B2* | 6/2009 | Jhala et al. | 707/3 |
| 7,657,514 | B2* | 2/2010 | Szulczewski | 707/3 |
| 7,668,823 | B2* | 2/2010 | Oldham et al. | 709/203 |
| 2004/0059708 | A1* | 3/2004 | Dean et al. | 707/1 |
| 2005/0065773 | A1 | 3/2005 | Huang et al. | |
| 2005/0076003 | A1* | 4/2005 | DuBose et al. | 707/1 |
| 2005/0137939 | A1* | 6/2005 | Calabria et al. | 705/26 |
| 2005/0154746 | A1 | 7/2005 | Liu et al. | |
| 2005/0187923 | A1 | 8/2005 | Cipollone | |
| 2006/0010117 | A1 | 1/2006 | Bonabeau et al. | |
| 2006/0085750 | A1 | 4/2006 | Easton, Jr. et al. | |
| 2006/0112076 | A1 | 5/2006 | Burris et al. | |
| 2006/0122979 | A1 | 6/2006 | Kapur et al. | |
| 2006/0122994 | A1* | 6/2006 | Kapur et al. | 707/4 |
| 2006/0149625 | A1* | 7/2006 | Koningstein | 705/14 |
| 2008/0140502 | A1* | 6/2008 | Birnholz et al. | 705/10 |
| 2008/0313035 | A1* | 12/2008 | Peeters et al. | 705/14 |
| 2009/0006207 | A1* | 1/2009 | Datar et al. | 705/14 |

OTHER PUBLICATIONS

Beitzel, Steven M., "On Understanding and Classifying Web Queries", Date: May 2006, Chicago, Illinois.
Chuang et al., "Enriching Web taxonomies through subject categorization of query terms from search engine logs", Date: 2003, http://scholar.google.com/scholar?hl=en&lr=&q=cache:0XXkNd7M9koJ:https://206.191.28.118/docushare/dsweb/Get/Document-1146/Chuang_and_Chien_2003.pcif+categorize+queries+into+taxonomy+.
Kerschberg et al., "A Semantic Taxonomy-Based Personalizable Meta-Search Agent", Date: 2001, pp. 41-50, vol. 1, http://csdl2.computer.org/persagen/DLAbsToc.jsp?resourcePath=/dl/proceedings/&toc=comp/proceedings/wise/2001/1393/01/1393toc.xml&DOI=10.1109/WISE.2001.996465.

* cited by examiner

Primary Examiner — Marc Somers

(57) ABSTRACT

Generating content to satisfy search engines queries is described. A knowledge base including a plurality of prior search queries for a search engine and corresponding prior search results provided by the search engine is accessed and a plurality of underserved search queries are identified, wherein each of the underserved search queries comprises a search query pattern having a below threshold number of search results. Each of the underserved search queries are heuristically related to one another. The plurality of underserved search queries are aggregated into a taxonomy category having a set of associated attributes, the attributes descriptive of the plurality of underserved search queries. Targeted content is generated based on the attributes, wherein the targeted content is tailored satisfy the underserved search queries.

20 Claims, 5 Drawing Sheets

400

GENERATING CONTENT TO SATISFY UNDERSERVED SEARCH QUERIES

FIELD

The field of the disclosure is generally related computer implemented search engines.

BACKGROUND

Search engines have become widely used by many in society. Generally, a search engine is an information retrieval system designed to help find information stored on a computer system, network, and the like. Search engines primarily function by reducing the time required to find information and/or the amount of information which must be consulted and sifted to find the desired end result.

The most commonly recognizable form of a search engine is a Web search engine which searches for information on the World Wide Web. Such Web search engines provide a standardized GUI interface (e.g., via a Web browser) that enables users to specify criteria about an item of interest, commonly referred to as a search query. The Web search engine then finds items that match the query. For example, in the case of a text search, the search query is typically expressed as a set of words that identify the desired concept that one or more documents may contain, such as, for example, "seafood restaurants in San Francisco" or "18 inch automobile tires". The search engine will then return a list of items that it believes the best matches the specified query.

The list of items that meet the specified query is typically sorted, or ranked, in some regard so as to place the most relevant items most prominently. Ranking items by relevance, for example, from highest to lowest relevance, generally reduces the time users must spend sifting through the returned information. Alternatively, probabilistic rankings sort items based on measures of similarity, and sometimes popularity or authority. Another example would be Boolean rankings, which typically only return items which match the specified query exactly, without regard to order.

With the widespread emergence of the World Wide Web and the increasing power of the Web search engines, the general public has come to extensively rely upon web searches to obtain content and other information. In many cases, there is a surfeit of links for simple or popular queries. For instance, the query "digital camera" produces literally hundreds of millions of links with varying degrees of relevance on most search engines.

On the other hand, many queries have far fewer links. For example, some very specialized queries have so few relevant links that the links only go a few pages (e.g., with 20 or so items per page) and often are not very relevant to the user. Such specialized queries are often described as being in the tail of the distribution of search queries. In many such cases, users are incredibly frustrated by their inability to find the information they are looking for. As more and more people increasingly rely upon web searches to obtain the content, information, resources, etc. that they are looking for, the overall level of dissatisfaction will only increase for those users pursuing specialized queries.

Thus, there is a problem with the fact that there are certain queries, usually not very popular ones, that have relatively few relevant links. These queries are called "underserved". What is required is a solution for identifying and intelligently handling underserved queries.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the claimed subject matter implement solutions for underserved queries that have comparatively few relevant links returned by search engines. Underserved queries can be identified and intelligently handled to generate content that satisfies demand made evident by the underserved queries.

In one embodiment, a knowledge base is accessed (e.g., by a server based process) and searched for prior search queries for a search engine and corresponding prior search results provided by the search engine. From the search results, the underserved search queries can be identified. Underserved search quires are typically those search queries which produce a comparatively few number of relevant results when entered into one or more of the widely used search engines. This is in comparison to, for example, well served search queries, which can typically produce a very large number of relevant results.

In one embodiment, the underserved search queries are identified as being those search query patterns that have a below threshold number of search results. Each of the underserved search queries are heuristically related to one another. The identified underserved search queries are then aggregated into a taxonomy category having a set of associated attributes, wherein the attributes are descriptive of the underserved search queries. Targeted content is generated based on the attributes. This targeted content is tailored to satisfy the underserved search queries.

In one embodiment, the generating of targeted content includes publishing the taxonomy category to content creators by using a marketplace environment (e.g., a web-based environment hosted on a server, etc.). One or more of the content creators can be selected to generate the targeted content, and this selection can be based on, for example, a bidding process implemented by the marketplace environment, or a first-come first-served process implemented by the marketplace environment, or the like.

In one embodiment, a rating hierarchy can be established for the targeted content by using a review environment (e.g., posted on a server, etc.). The review environment can be used to receive review inputs that described the quality, nature, etc. of the targeted content, and the rating hierarchy can be adjusted in accordance with the review inputs. The review inputs can be received from, for example, content creators, users, or the like.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

Reference will now be made in detail to embodiments of the claimed subject matter, examples of which are illustrated in the accompanying drawings. While the embodiments will be described, it will be understood that the description are not intended to limit the claimed subject matter to these embodiments. On the contrary, the claimed subject matter is intended to cover alternatives, modifications and equivalents, which may be included within the spirit and scope as defined by the appended claims. Furthermore, in the following detailed description, numerous specific details are set forth in order to provide a thorough understanding of the embodiments. However, it will be recognized by one of ordinary skill in the art that the embodiments may be practiced without these specific details. In other instances, well-known methods, procedures, components, and circuits have not been described in detail as not to unnecessarily obscure aspects of the embodiments.

Some portions of the detailed descriptions are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "aggregating" or "sorting" or the like, refer to the action and processes of a computer system (e.g., computer system 500 of FIG. 5), or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
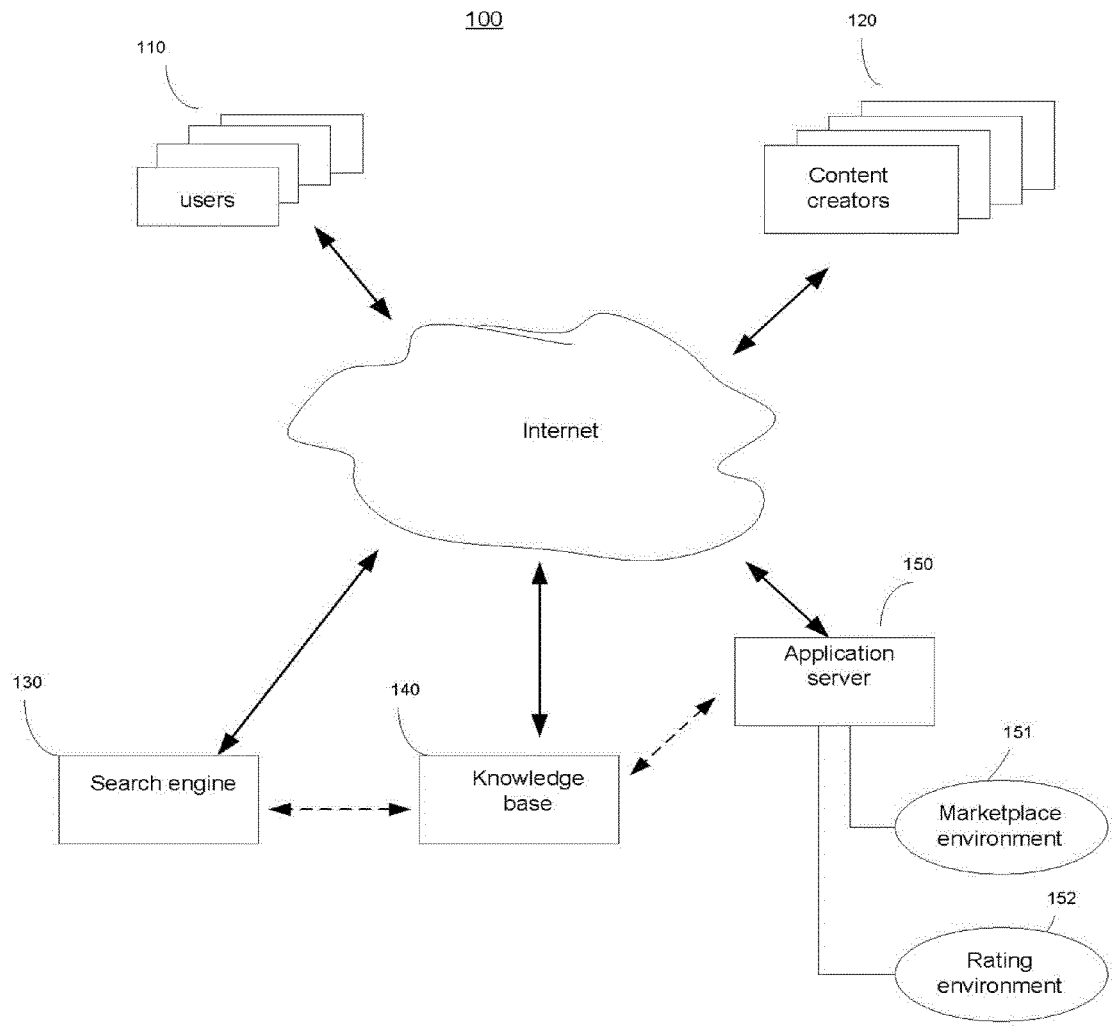
FIG. 1 shows a diagram of an exemplary system for generating content in accordance with one embodiment.

FIG. 1 shows a diagram of an exemplary system 100 for generating targeted content in accordance with one embodiment. As depicted in FIG. 1, system 100 illustrates the relationships and the communications that are implemented between users 110, content creators 120, a search engine 130, a knowledge base 140, and an application server 150, each coupled to communicate via the Internet.

The system 100 embodiment implements a solution for handling underserved queries that have comparatively few relevant links returned by search engines. Through the functionality provided by, for example, the application server 150, underserved search queries can be identified and intelligently handled to generate targeted content that satisfies demand made evident by the underserved search queries. The users 110 typically comprise client computer systems that are used by individuals to access content via the Internet. As such, the client computer systems execute a Web browser interface, or the like. The search engine 130 can be a typical web-based search engine that is accessed by users to obtain content. Such Web search engines provide a standardized GUI interface that enables users to specify a query about an item of interest, and the Web search engine then finds items that match the query.

The knowledge base 140 functions by storing descriptive information about the queries that users have been entering and the items that have been returned to match the queries. The descriptive information can include, for example, the number of times the specific words have appeared within a certain text query, the number of users that enter queries of that type, the number relevant results that have been found per the query, and the like. The knowledge base 140 can be implemented as one or more databases, index, reference schema. The objective of the knowledge base 140 is to maintain an accessible storehouse of descriptive information about the search queries that the users have been making.

The application server 150 is implemented as one or more server computer systems that execute certain functionality of the system 100 embodiment. The application server 150 accesses the descriptive information stored in the knowledge base 140 to identify those underserved search queries. The application server 150 can also implement a marketplace environment 151 and a rating environment 152. The functions provided by the application server 150, in conjunction with the marketplace environment 151 and the rating environment 152, can be used to select, recruit, and otherwise obtain the services of the content creators 120, who will work to generate the targeted content to satisfy the identified underserved searches. The system 100 functionality will now be described with reference to a flow chart of the steps of a content creation process 200 in FIG. 2.

Figure 2:
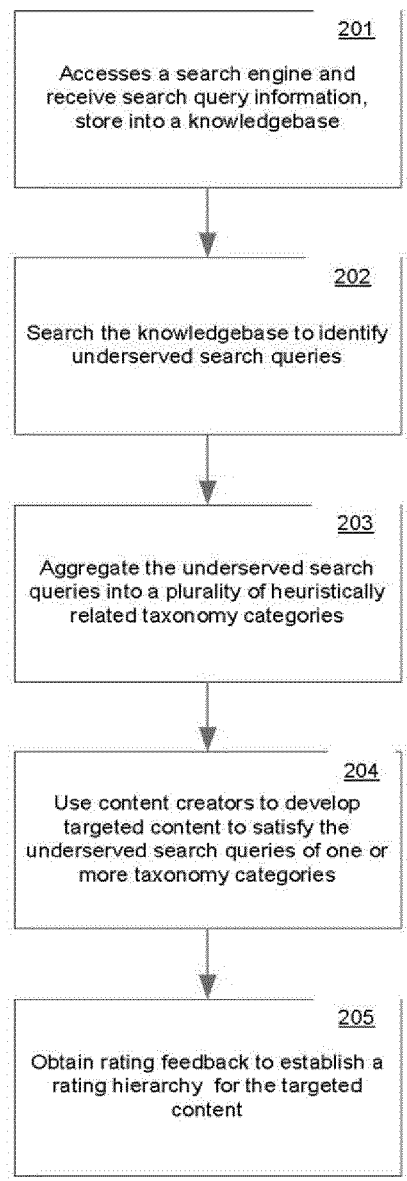
FIG. 2 shows a flowchart of the steps of a content creation process in accordance with one embodiment.

FIG. 2 shows a flowchart of the steps of a content creation process 200 in accordance with one embodiment. As depicted in FIG. 2, process 200 shows the exemplary steps that are executed to identify underserved search queries and generate targeted content to satisfy those underserved search queries.

Process 200 begins in the 201, where the knowledge base 140 receives search engine query information from the search engine 130. As described above, the users 110 input their search queries into the search engine 130 to obtain desired content. The desired content can include, for example, information regarding certain items for sale, photographs, diagrams or images, references to textbooks, and the like. During a typical day, search engine 130 can receive search queries numbering in the millions or more. Each of these queries generates lists of relevant results, often multiple pages of relevant results with dozens or more results per page. Descriptive information regarding these search queries and their corresponding results is obtained from the search engine 130 by the knowledge base 140 and stored therein.

In step 202, the knowledge base 140 is accessed by the application server 150 and searched. In one embodiment, the knowledge base 140 is accessed by a heuristics engine that is specifically configured to search the knowledge base 140 for prior search queries and corresponding search results. The objective of the search by the heuristics engine is to identify the underserved search queries. From the search results, the underserved search queries can be identified. For example, underserved search queries are typically those search queries which produce a comparatively few number of relevant results when entered into the search engine 130. This is in comparison to, for example, well served search queries, which can typically produce a very large number of relevant results.

The heuristics engine can utilize a number of different measures to specifically identify those search queries that are underserved. For example, in one embodiment, the underserved search queries are identified as being those search query patterns that have a below threshold number of search results. For example, some underserved search queries may produce only one page of relevant results, and these results may not be as relevant as the user would desire. In these cases, it is relatively straightforward to ascertain those search queries which returned a below threshold number of results (e.g., fewer than 20 results, or one page, etc.). Similarly, in these cases the degree of relevancy can be ascertained by, for example, counting the number of times the user actually clicks through on one or more of the returned results.

Other measures can also be employed that take into account more real-world factors rather than just the basic ratio of queries to results. Such real-world factors can include, for example, whether items were being searched for purchase or sale (e.g., old albums, car parts, sports collectibles, etc.), whether items reflect a particular artistic taste (e.g., paintings or sculptures by less well-known artists, photographs or landscapes by less well-known photographers, etc.), whether the items reflect the existence of a particularly dedicated group of adherents (e.g., fans of some television series, movie, etc.).

In step 203, underserved search queries are sorted and aggregated into a plurality of heuristically related taxonomy categories. For example, as the heuristics engine sorts through the underserved search queries of the knowledge base, each of the above described factors and each of the above described characteristics reveal the fact that the underserved searches can be sorted into groups, where each of the underserved search queries in a given group is heuristically related to the others. For example, one taxonomy category could be those search queries relevant to a particular photographer. Another taxonomy category could be those search queries relevant to a particular old automobile. In this manner, the underserved search queries can be automatically categorized and placed into a taxonomy category such that these queries can then be aggregated into larger, broader and more generic collections.

In step 204, once the underserved search queries are aggregated into taxonomy categories that are heuristically related, these categories are matched with one or more content creators 120 with the objective of developing targeted content specific for the taxonomy category. The targeted content is specifically designed to satisfy the evident demand.

In one embodiment, certain specific taxonomy categories can be chosen based upon whether they will exist an economic benefit to developing content to satisfy the evident demand of those categories. For example, there may be a greater economic incentive to develop content for those taxonomy categories relating to items that were being searched for purchase or sale (e.g., old albums, car parts, sports collectibles, etc.). These categories indicating a greater likelihood of economic incentive to develop content can be identified as those underserved queries which reflect an "arbitrage" opportunity, or those underserved queries which will most likely economically reward a content developer. It should be noted that the aggregation process is beneficial, since without it, the individual underserved search queries could be too granular to justify creating targeted content to satisfy such interest.

Accordingly, in one embodiment, a marketplace environment 151 is implemented to advantageously utilize the arbitrage opportunities provided by the underserved search queries. The marketplace environment can be a typical network-based platform or environment (e.g., a web-based environment hosted on a server, etc.) that allows a number of bidders to be matched to one or more of the taxonomy categories. For example, an auction process can be implemented that can auction the right to develop content for the taxonomy category to the highest bidder. Alternatively, for those taxonomy categories which may not be economically lucrative, a first-come first-served matching process can be used to match content creators to the taxonomy category. In this manner, the taxonomy category is published to content creators via the marketplace environment 151, which thereby allows a number of content creators 120 to access and perhaps bid for the right to create targeted content for the taxonomy category.

In step 205, a rating hierarchy is established for the targeted content by using a review environment 152. As with the marketplace environment 151, the review environment 152 can be a typical network-based platform or environment that allows people to solicit and obtain rating feedback on the targeted content. The review environment can be used to receive review inputs that described the quality, nature, etc. of the targeted content, and the rating hierarchy can be adjusted in accordance with the review inputs. The review inputs can be received from, for example, content creators, users, or the like. The existence of the rating hierarchy adds value to users by, for example, materially increasing the likelihood that they find particularly relevant targeted content. The targeted content can be subject to ratings and reviews of peers and/or the general public. Thus, substandard or otherwise unpopular targeted content would fail to achieve high ratings and would probably drop in relevance and ranking over time.

In this manner, process 200 implements a market-driven content creation process that can generate targeted content to satisfy underserved search queries. Process 200 organizes these underserved search queries so that they are aggregated into broader, more general, and more useful taxonomy categories, and then utilizes a market driven mechanism by which content creators can discover these underserved queries and produce and publish content to satisfy the evident unmet demand. In this manner, process 200 illustrates ways in which this market mechanism can deliver economic benefit for the authors of the targeted content and how ordinary users can participate in validating, rating and endorsing the created content, thus creating a community.

Figure 3:
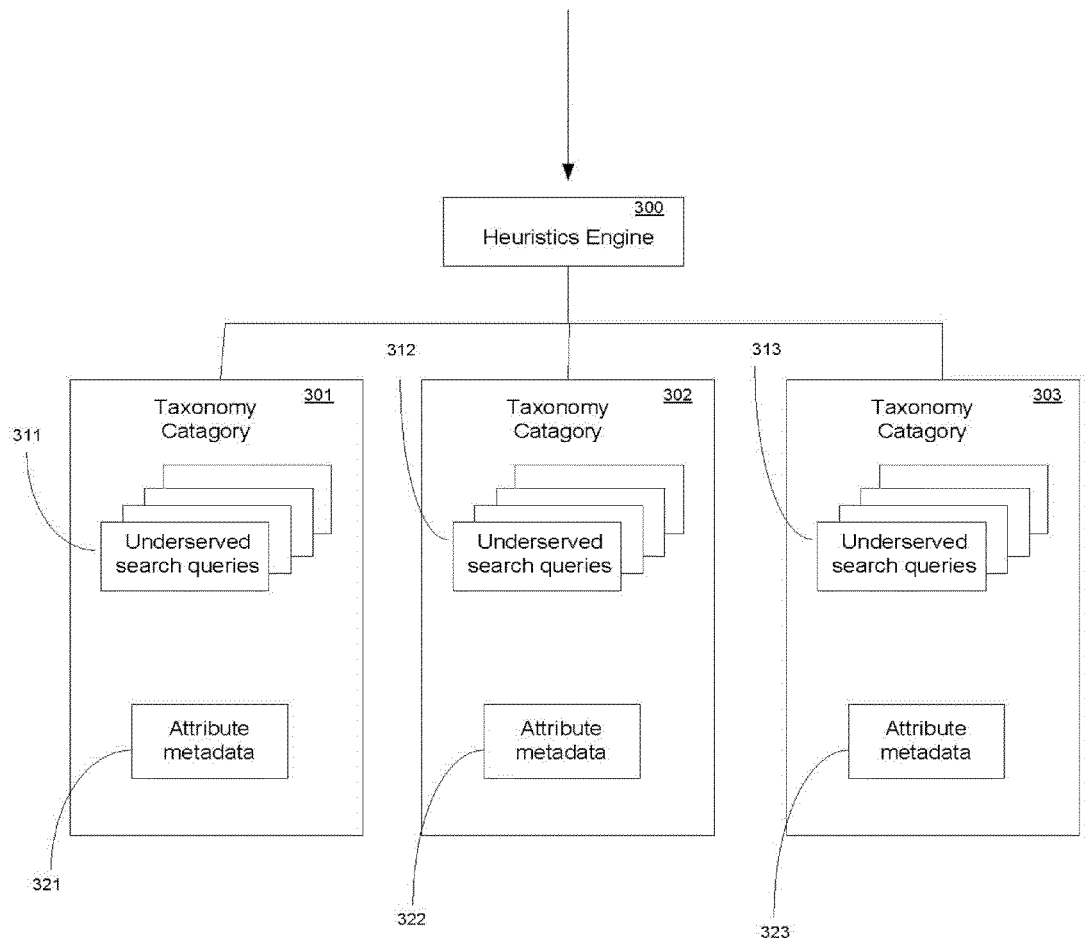
FIG. 3 shows a diagram of a heuristics engine and a plurality of taxonomy categories in accordance with one embodiment.

FIG. 3 shows a diagram of a heuristics engine 300 and a plurality of taxonomy categories 301-303 in accordance with one embodiment. As depicted in FIG. 3, the heuristics engine 300 sorts the underserved search queries 311-313 obtained from the knowledge base.

As described above, the heuristics engine 300 examines the prior search queries to identify those underserved search queries. Based upon certain above described factors, the underserved searches are sorted into taxonomy categories 301-303, where each of the underserved search queries in a given taxonomy category is heuristically related to the others. Thus, in the FIG. 3 embodiment, the underserved search queries 311 are heuristically related as determined by certain attribute metadata 321 that describes characteristics of the overall aggregation. Similarly, the underserved search queries 312 and 313 are heuristically related in accordance with the attribute metadata 322 and 323, respectively. In this manner, a large number of taxonomy categories can be sorted and aggregated (e.g., many more than the categories 301-303). As described above, one or more of these taxonomy categories can be identified as representing a particularly lucrative arbitrage opportunity, and thus be well-suited for publication via the marketplace environment 151.

Figure 4:
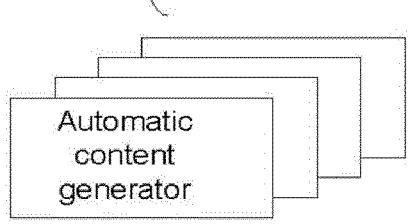
FIG. 4 shows a diagram of an exemplary system for automatically generating content in accordance with one embodiment.
Figure 4:
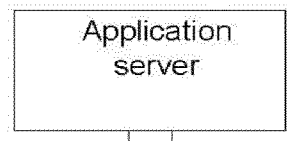

FIG. 4 shows a diagram of an exemplary system 400 for automatically generating content in accordance with one embodiment. As depicted in FIG. 4, system 400 illustrates the use of a set of automatic content generators 420 with the application server 150.

The system 400 functions in a manner substantially similar to the system 100 of FIG. 1. System 400, however, utilizes the automatic content generators 420 to create targeted content for the underserved search queries. The automatic content generators 420 are configured to utilize automated computer implemented functionality to create targeted content. This provides a means for the creation of targeted content without relying upon, for example, a user community of content creators. The automatic content generators can access attribute metadata for the taxonomy categories (e.g., the attribute metadata 321 for the taxonomy category 301 of FIG. 3) produced by the heuristics engine (e.g., a heuristics engine 300) and automatically generate targeted content that satisfies the evident demand.

The automatic content generators 420 can implement a number of strategies for generating the targeted content. For example, in one embodiment, a specific web-based search can be performed to find particularly related content for the taxonomy category. This related content can include, for example, web pages or links believed to be relevant to underserved search queries in the category. Another example would be a case where targeted content from an "adjacent" taxonomy category would be suggested to a user. For example, consider a user with behavioral patterns in prior searches or browsing activity demonstrating interest in popular music. This same user now searching for information about a 1957 automobile could be presented with information from an adjacent category describing popular music from 1957, or the like. In this manner, one objective of the automatic content generator 420 would be to provide a means for generating targeted content that is more immediately responsive than recruiting traditional content creators (e.g., artists, enthusiasts, collectors, hobbyists, etc.).

Figure 5:
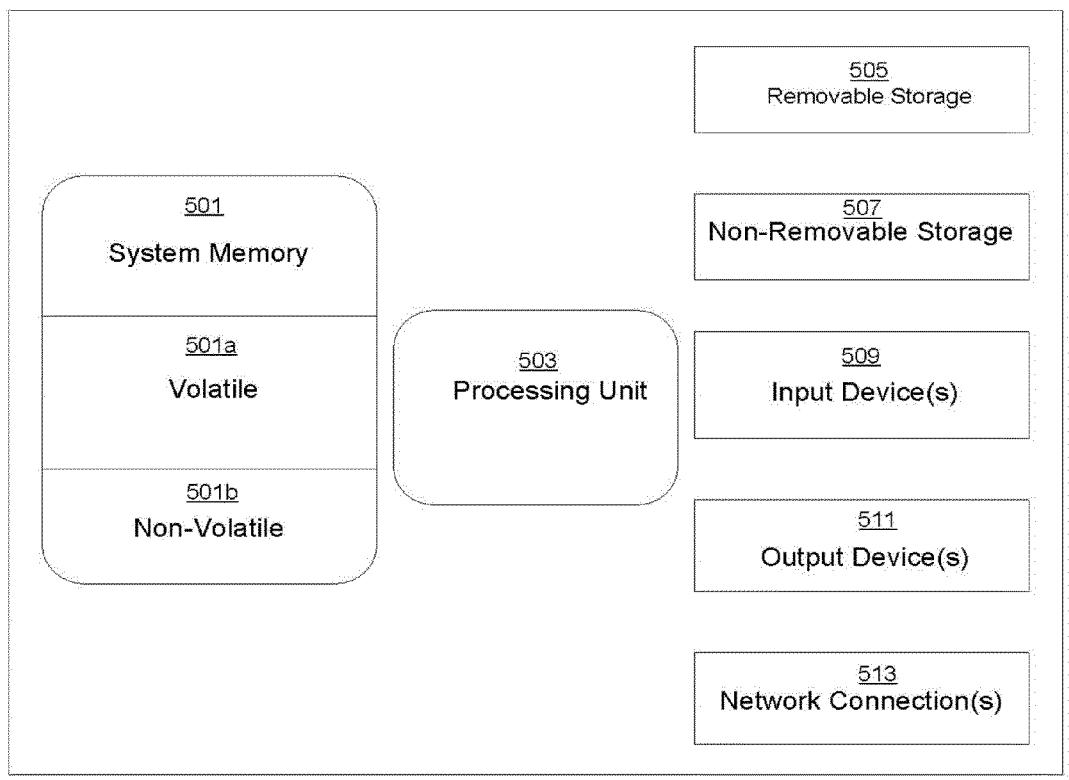
FIG. 5 shows an exemplary computer system according to one embodiment.

FIG. 5 shows an exemplary computer system 500 according to one embodiment. Computer system 500 depicts the components of a basic computer system providing the execution environment for certain hardware-based and software-based functionality for the above described embodiments. For example, computer system 500 can be a system upon which the components 300 and 301-303 from FIG. 3 are instantiated. Computer system 500 can be implemented as, for example, a desktop computer system, laptop computer system or server computer system. Similarly, computer system 500 can be implemented as a handheld device. Computer system 500 typically includes at least some form of computer readable media. Computer readable media can be a number of different types of available media that can be accessed by computer system 500 and can include, but is not limited to, computer storage media.

In its most basic configuration, computer system 500 typically includes processing unit 503 and memory 501. Depending on the exact configuration and type of computer system 500 that is used, memory 501 can be volatile (e.g., such as DRAM, etc.) 501a, non-volatile 501b (e.g., such as ROM, flash memory, etc.) or some combination of the two.

Additionally, computer system 500 can include mass storage systems (e.g., removable 505 and/or non-removable 507) such as magnetic or optical disks or tape. Similarly, computer system 500 can include input devices 509 and/or output devices 511 (e.g., such as a display). Computer system 500 can further include network connections 513 to other devices, computers, networks, servers, etc. using either wired or wireless media. As all of these devices are well known in the art, they need not be discussed in detail.

The foregoing descriptions of the embodiments have been presented for purposes of illustration and description. They are not intended to be exhaustive or to limit the claimed subject matter to the precise forms disclosed, and many modifications and variations are possible in light of the above teaching. The embodiments were chosen and described in order to best explain the principles and practical applications of the embodiments, to thereby enable others skilled in the art to best utilize the invention and various embodiments with various modifications as are suited to the particular use contemplated. It is intended that the scope of the claimed subject matter be defined by the claims appended hereto and their equivalents.

What is claimed is:

1. A method comprising:
   accessing a knowledge base including a plurality of prior search queries for a search engine and corresponding prior search results provided by the search engine;
   identifying, from the plurality of prior search queries, a plurality of underserved search queries, wherein each of the underserved search queries comprises a search query pattern having a below threshold number of search results;
   aggregating the plurality of underserved search queries into a for-sale taxonomy category and at least one other taxonomy category, the for-sale taxonomy category including individual underserved search queries that search for items for purchase or sale;
   selecting a first content creator to generate first targeted content based on attributes of the for-sale taxonomy category, wherein:
      the first targeted content is tailored to satisfy the individual underserved search queries in the for-sale taxonomy category; and
      the first content creator is selected using a bidding process for the for-sale taxonomy category based on the for-sale taxonomy category including the individual underserved search queries that search for items for purchase or sale; and
   selecting a second content creator to create second targeted content for the at least one other taxonomy category, the second content creator being selected using a first-come first-served process.

2. The method of claim 1, further comprising:
   publishing the for-sale taxonomy category to a plurality of content creators from which the first content creator is selected, the for-sale taxonomy category being published using a marketplace environment.

3. The method of claim 2, wherein another content creator is selected using the bidding process in instances when another taxonomy category is economically lucrative.

4. The method of claim 2, wherein the second content creator is selected using the first-come first-served process in instances when the at least one other taxonomy category is not economically lucrative.

5. The method of claim 1, further comprising:
   establishing a rating hierarchy for the first targeted content by using a review environment;
   receiving a plurality of review inputs descriptive of the first targeted content via the review environment; and
   adjusting the rating hierarchy in accordance with the review inputs.

6. The method of claim 5, wherein the review inputs received via the review environment are from a plurality of content creators from which the first content creator is selected.

7. The method of claim 5, wherein the review inputs received via the review environment are from users.

8. A system comprising:
a computer system having a processor coupled to a memory, the memory storing computer readable code which when executed by the processor, causes the computer system to:
access a knowledge base including a plurality of prior search queries for a search engine and corresponding prior search results provided by the search engine;
identify, from the plurality of prior search queries, a plurality of underserved search queries, wherein each of the underserved search queries comprises a search query pattern having a below threshold number of search results, and wherein each of the underserved search queries are heuristically related;
aggregate the plurality of underserved search queries into a taxonomy category having a set of associated attributes, the attributes being descriptive of the plurality of underserved search queries;
implement a marketplace environment to publish the taxonomy category to a plurality of content creators; and
select at least one of the plurality of content creators to generate targeted content tailored to satisfy the underserved search queries,
wherein the at least one content creator is selected using a bidding process in some instances, responsive to a determination that the plurality of underserved search queries in the taxonomy category relate to user searches for items that are for purchase or sale, and
wherein the at least one content creator is selected using a first-come first-served process in other instances.

9. The system of claim 8, wherein the at least one content creator is selected to generate the targeted content for another taxonomy category using the bidding process when the another taxonomy category is economically lucrative.

10. The system of claim 8, wherein the other instances where the at least one content creator is selected to generate the targeted content using the first-come first-served process comprise instances when the taxonomy category is not economically lucrative.

11. The system of claim 8, wherein the computer system is configured to sort the targeted content into a rating hierarchy by using a review environment, receive a plurality of review inputs descriptive of the targeted content via the review environment, and adjust the rating hierarchy in accordance with the review inputs.

12. The system of claim 11, wherein the review inputs received via the review environment are from the plurality of content creators.

13. The system of claim 11, wherein the review inputs received via the review environment are from users.

14. One or more computer readable storage devices storing instructions which, when executed by one or more processing devices, cause the one or more processing devices to perform:
searching a knowledge base including a plurality of prior search queries for a search engine and corresponding prior search results provided by the search engine;
selecting, from the plurality of prior search queries, a plurality of underserved search queries, wherein each of the underserved search queries comprises a search query pattern having a below threshold number of search results, and wherein each of the underserved search queries are heuristically related;
associating the plurality of underserved search queries with a taxonomy category having a set of associated attributes, the attributes being descriptive of the plurality of underserved search queries; and
selecting a content creator to generate targeted content based on the attributes, wherein:
the targeted content is tailored to satisfy the underserved search queries,
the content creator is selected using a bidding process in instances when the plurality of underserved search queries relate to items that are for purchase or sale, and
the content creator is selected using a first-come first-serve process in other instances.

15. The one or more computer readable storage devices of claim 14, wherein the selecting the content creator further comprises:
providing the taxonomy category to a plurality of content creators from which the content creator is selected, the taxonomy category being provided using a marketplace environment.

16. The one or more computer readable storage devices of claim 15, wherein the content creator is selected using the bidding process for another taxonomy category that does not relate to items for purchase or sale, provided the another taxonomy category is economically lucrative.

17. The one or more computer readable storage devices of claim 14, wherein the content creator is a computer implemented automatic content generator that generates the targeted content by suggesting content from an adjacent taxonomy category.

18. The one or more computer readable storage devices of claim 14, further comprising:
establishing a rating hierarchy for the targeted content by using a review environment;
receiving a plurality of review inputs descriptive of the targeted content via the review environment; and
adjusting the rating hierarchy in accordance with the review inputs.

19. The one or more computer readable storage devices of claim 17, the adjacent taxonomy category and the taxonomy category having, for an individual attribute, the same value.

20. The one or more computer readable storage devices of claim 19, the individual attribute comprising a year.

* * * * *